(No Model.)
W. J. ENGLISH.
WATER TRAP.
No. 249,031. Patented Nov. 1, 1881.
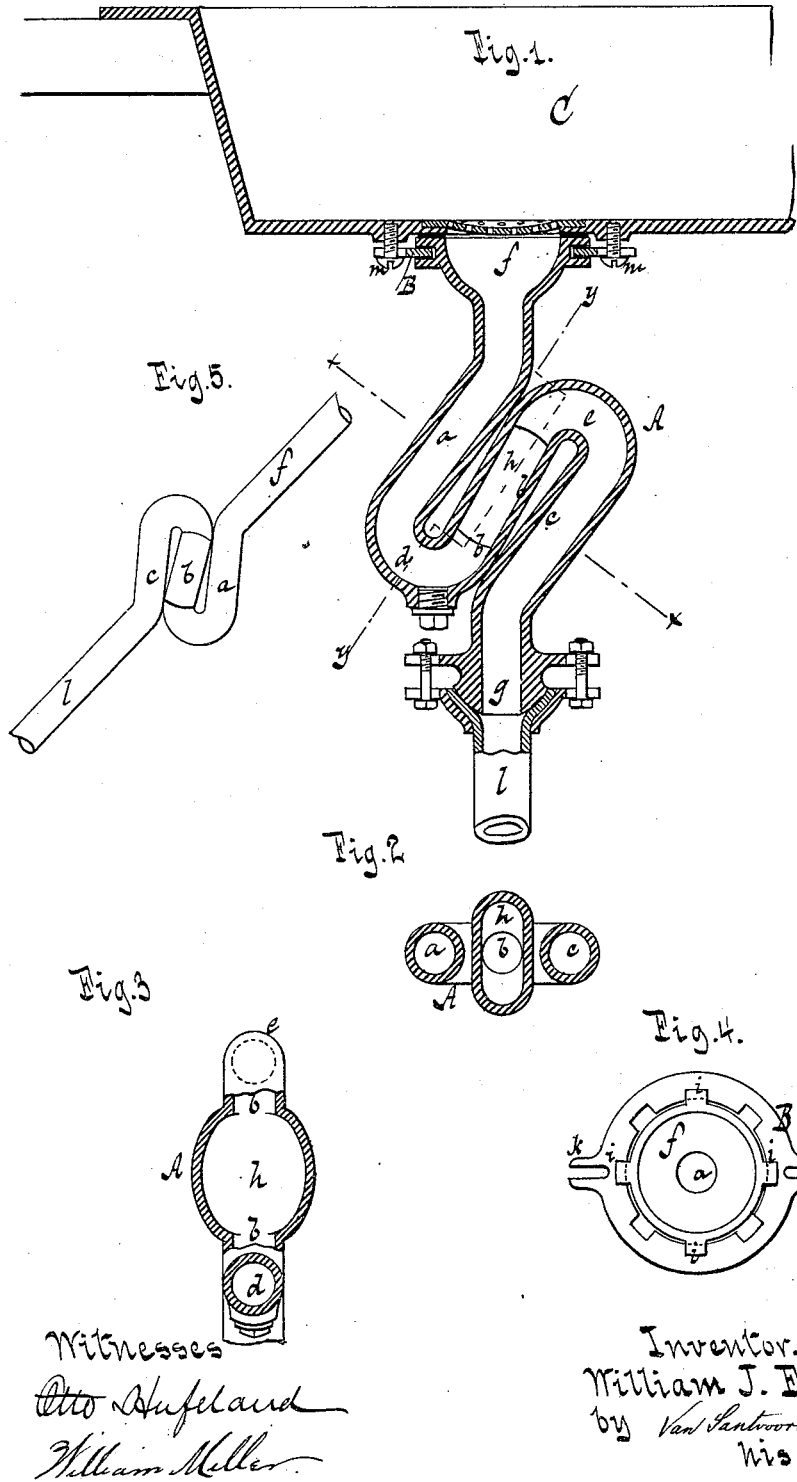

UNITED STATES PATENT OFFICE.

WILLIAM J. ENGLISH, OF COHOES, NEW YORK.

WATER-TRAP.

SPECIFICATION forming part of Letters Patent No. 249,031, dated November 1, 1881.

Application filed June 3, 1881. (No model.)

*To all whom it may concern:*

Be it known that I, WILLIAM J. ENGLISH, a citizen of the United States, residing at Cohoes, in the county of Albany and State of New York, have invented new and useful Improvements Water-Traps, of which the following is a specification.

This invention relates to improvements in that class of water-traps which are known as "S-traps;" and the objects of my invention are to lessen the labor of making the connections.

The invention is illustrated in the accompanying drawings, in which Figure 1 represents a central section of my trap. Fig. 2 is a transverse section in the plane $x\, x$, Fig. 1. Fig. 3 is a longitudinal section in the plane $y\, y$, Fig. 1. Fig. 4 is an end view of the mouth of my trap. Fig. 5 shows my trap connected to an inclined pipe.

Similar letters indicate corresponding parts.

In these drawings, the letter A designates my trap, which is composed of three limbs, $a$ $b$ $c$, nearly parallel to each other and connected to each other by the crooks $d$ $e$.

The free end of the limb $a$, which forms the mouth $f$ of my trap, and the free end of the limb $c$, which forms the discharge-opening $g$, are brought in such a position that they are in line with each other, so that if my trap is inserted into a pipe the delivery part of this pipe will remain in line with its discharge part, and consequently the operation of making the connections will be materially facilitated.

The middle limb, $b$, of my trap is provided with an enlargement or chamber, $h$, (see Figs. 2 and 3,) the object or which is to retain a quantity of air and to prevent the trap from being siphoned out.

This improvement is applicable to S traps of every description, which, as is a well-known fact, are liable to become siphoned out if a strong current of water is caused to pass through them. This difficulty is avoided by the chamber $h$, since a portion of the air which is carried down into the trap with the water is caught in the chamber $h$, and if the supply of water stops the draft produced by the discharging current empties the trap down to the chamber $h$; but as soon as the air contained in said chamber is liberated the suction stops and the trap cannot be siphoned out.

The mouth $f$ of my trap is provided with outwardly-projecting lips $i$, and with it is combined a ring, B, which is provided with recesses $j$ and with outwardly-projecting slotted arms $k$.

The recesses $j$ correspond in number and position to the lips $i$, so that the ring can be dropped over the mouth $f$, and that by turning it round it can be used to connect the trap to the bottom of a sink, C, or to any other article of a similar nature.

The screws $m$, which serve to make the connection, pass through the slotted arms $k$. (See Fig. 1.)

It will be noticed that the ring B can be turned in either direction, so that the slotted arms can be brought into the most convenient position to make the desired connection.

The waste-pipe $l$ is connected to the discharge end $g$ of my trap by any suitable means.

If my trap is placed in such a position that the limbs $a$ $b$ $c$ are upright, the discharge end $g$ is still lower than the inlet $f$ and the seal is maintained.

Moreover, if my trap be turned from the position shown part way or less or more of the way round in a vertical plane, it will be found that a deep seal is presented at any point to which the trap may be turned; hence this trap is adapted for pipes running either in vertical or inclined planes.

What I claim as new, and desire to secure by Letters Patent, is—

1. The water-trap consisting of three substantially parallel limbs, $a$, $b$, and $c$, connected by two bends, $d$ and $e$, as described, the mouth of the limb $a$ and the discharge-opening of the limb $c$ being in line with each other, whereby the trap can be turned at any angle in a vertical plane and a deep seal still be preserved, substantially as set forth.

2. The water-trap consisting of the three substantially parallel limbs, $a$, $b$, and $c$, communicating through two bends, $d$ and $e$, the limb $b$ being interposed between the limbs $a$ and $c$, and formed with a laterally-projecting side enlargement, $h$, substantially as and for the purpose set forth.

In testimony whereof I have hereunto set my hand and seal in the presence of two subscribing witnesses.

WILLIAM J. ENGLISH. [L. S.]

Witnesses:
 WM. H. SMITH,
 JAS. H. PYNES.